US011327836B1

(12) United States Patent
Wu et al.

(10) Patent No.: US 11,327,836 B1
(45) Date of Patent: May 10, 2022

(54) PROTECTION OF DATA ON A DATA PATH IN A MEMORY SYSTEM

(71) Applicant: XILINX, INC., San Jose, CA (US)

(72) Inventors: Danny Tsung-Heng Wu, San Jose, CA (US); David Tran, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/037,382

(22) Filed: Sep. 29, 2020

(51) Int. Cl.
*G06F 11/00* (2006.01)
*G06F 11/10* (2006.01)

(52) U.S. Cl.
CPC ................................ *G06F 11/1068* (2013.01)

(58) Field of Classification Search
None
See application file for complete search history.

(56) References Cited

U.S. PATENT DOCUMENTS

| | | | |
|---|---|---|---|
| 7,814,300 B2 | 10/2010 | Moyer et al. | |
| 8,091,010 B2 | 1/2012 | Mm | |
| 8,996,957 B1 | 3/2015 | Northcott | |
| 9,021,336 B1 | 4/2015 | Northcott | |
| 9,229,813 B2 | 1/2016 | Chatradhi et al. | |
| 9,772,900 B2 | 9/2017 | Hu et al. | |
| 2007/0028140 A1* | 2/2007 | Takeda ............... | G11B 20/1833 714/6.12 |
| 2010/0058151 A1 | 3/2010 | Parker et al. | |
| 2015/0106678 A1* | 4/2015 | Jeon .................... | G06F 11/1048 714/773 |
| 2015/0194984 A1* | 7/2015 | Tsuboi ................ | H03M 13/095 714/758 |
| 2016/0041872 A1* | 2/2016 | Ku ...................... | G06F 11/1052 714/764 |
| 2017/0147431 A1* | 5/2017 | West ..................... | G11C 29/52 |
| 2017/0147432 A1* | 5/2017 | Suh ....................... | G06F 3/0619 |

(Continued)

FOREIGN PATENT DOCUMENTS

WO 2013096158 A1 6/2013

OTHER PUBLICATIONS

S. Gregori, A. Cabrini, O. Khouri and G. Torelli, "On-chip error correcting techniques for new-generation flash memories," in Proceedings of the IEEE, vol. 91, No. 4, pp. 602-616, Apr. 2003, doi: 10.1109/JPROC.2003.811709. (Year: 2003).*

(Continued)

*Primary Examiner* — Daniel F. McMahon
(74) *Attorney, Agent, or Firm* — Patterson + Sheridan, LLP

(57) ABSTRACT

Some examples herein provide for protection of data on a data path in a memory system in an integrated circuit. In an example, an integrated circuit includes a bit checker circuit, an Error Correcting Code (ECC) encoder circuit, an ECC decoder circuit, and a check bit generation circuit. The bit checker circuit is configured to check write data based on write-path check bit(s). The ECC encoder circuit is configured to generate a write encoded ECC value based on the write data. The write encoded ECC value is to be written to the memory with the write data. The ECC decoder circuit is configured to decode a read encoded ECC value and check read data based on the read encoded ECC value. The read encoded ECC value and read data are read from the memory. The check bit generation circuit is configured to generate read-path check bit(s) from the read data.

20 Claims, 9 Drawing Sheets

(56) References Cited

U.S. PATENT DOCUMENTS

| | | | |
|---|---|---|---|
| 2018/0024897 A1* | 1/2018 | Cai | G06F 11/18 |
| | | | 714/6.12 |
| 2018/0032415 A1* | 2/2018 | Song | G06F 11/2094 |
| 2021/0034457 A1* | 2/2021 | Kim | G06F 11/1048 |

OTHER PUBLICATIONS

Y. Zhang et al., "Design and Verification of SRAM Self-Detection Repair Based on ECC and BISR Circuit," 2019 IEEE 26th International Symposium on Physical and Failure Analysis of Integrated Circuits (IPFA), 2019, pp. 1-5, doi: 10.1109/IPFA47161.2019.8984845. (Year: 2019).*

* cited by examiner

US 11,327,836 B1

PROTECTION OF DATA ON A DATA PATH IN A MEMORY SYSTEM

TECHNICAL FIELD

Examples of the present disclosure generally relate to a memory system in an integrated circuit and, in particular, to protection of data on a data path in a memory system in an integrated circuit.

BACKGROUND

Memory integrity is a factor for a wide variety of integrated circuits. Memory errors, which affect memory integrity, can occur that corrupt data stored in the memory. Additionally, communication paths to and from memory can cause errors in data that is stored to or read from memory, which can appear as if the data was corrupted like a memory error. Regardless of the source of an error, corrupted data can adversely affect operation of systems that rely on the data stored in memory. For example, if an input bit first written to and then read from memory is corrupted, an operation using that bit, e.g., as an instruction argument or operand may cause an incorrect result. Depending on the nature of the corrupted data, undesirable consequences may occur.

SUMMARY

Some examples described herein provide for protection of data on a data path in a memory system in an integrated circuit. Some examples described herein provide a protection mechanism in a memory system that protects integrity of data communicated along data paths in the memory system that are not protected by an Error Correcting Code (ECC) mechanism. Accordingly, full data path protection in a memory system can be achieved.

An example of the present disclosure is an integrated circuit. The integrated circuit includes a bit checker circuit, an Error Correcting Code (ECC) encoder circuit, an ECC decoder circuit, and a check bit generation circuit. The bit checker circuit is configured to check write data for an error based on one or more write-path check bits. The write data is to be written to memory. The ECC encoder circuit is configured to generate a write encoded ECC value based on the write data. The write encoded ECC value is to be written to the memory with the write data. The ECC decoder circuit is configured to decode a read encoded ECC value and check read data for an error based on the read encoded ECC value. The read encoded ECC value and the read data are read from the memory. The check bit generation circuit is configured to generate one or more read-path check bits from the read data.

Another example of the present disclosure is a method. A request is received by a memory system. Read data and a read encoded ECC value are read from memory based on the request. The read data is checked, by an ECC decoder circuit of the memory system, based on the read encoded ECC value. One or more read-path check bits are generated, by a check bit generation circuit of the memory system, based on the read data.

Another example of the present disclosure is a method. A request that includes request data and one or more request check bits is received by a memory system. The request data is checked, by a bit checker circuit of the memory system, for an error based on the one or more request check bits. An encoded ECC value is generated, by an ECC encoder circuit of the memory system, based on the request data. The request data and the encoded ECC value are written to memory of the memory system.

These and other aspects may be understood with reference to the following detailed description.

BRIEF DESCRIPTION OF THE DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
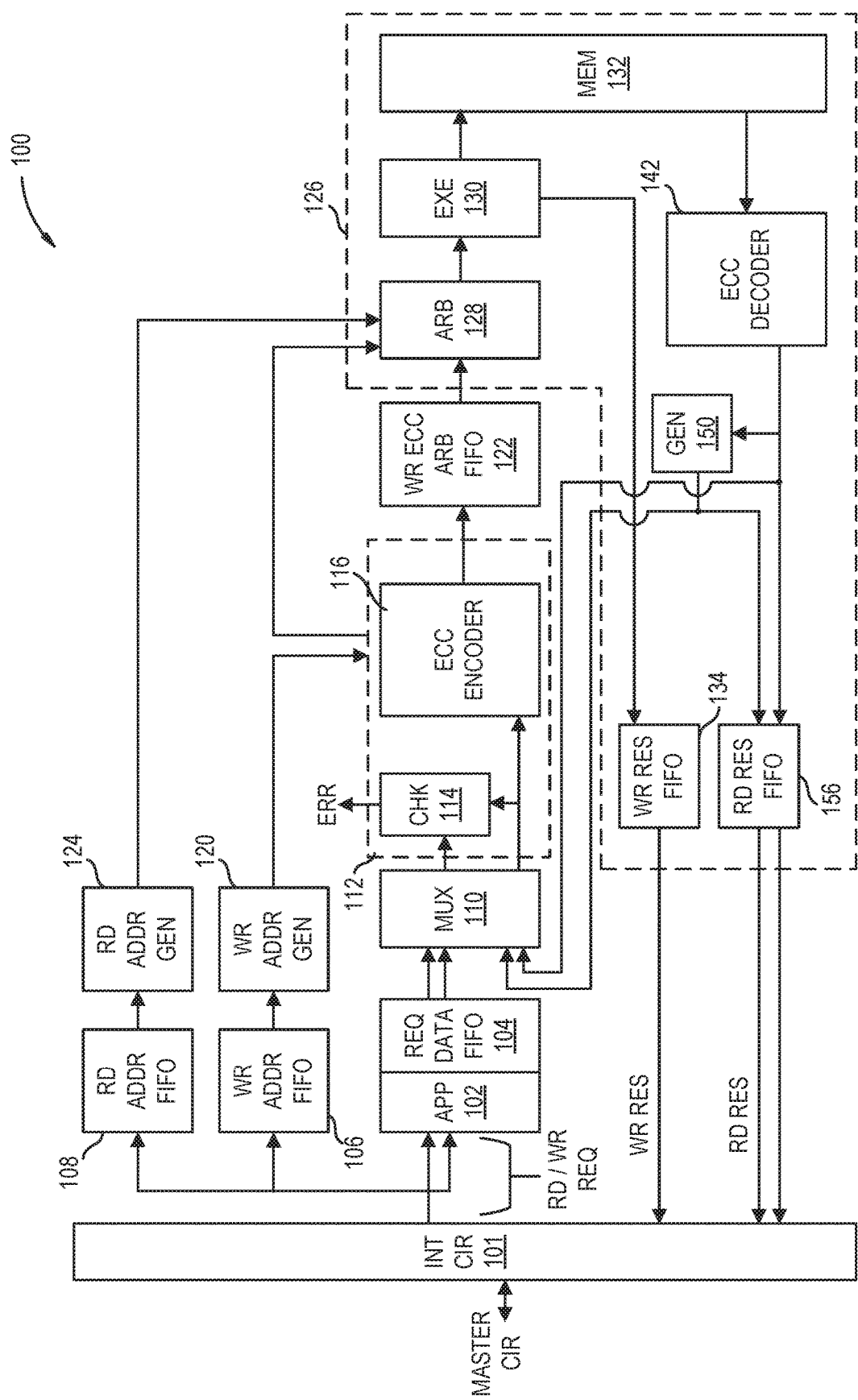
FIG. 1 illustrates a simplified schematic of a memory system according to some examples.

Some examples described herein provide for integrity protection of data on a data path in a memory system in an integrated circuit. Some examples described herein provide a protection mechanism in a memory system that protects integrity of data communicated along data paths in the memory system that are not protected by an Error Correcting Code (ECC) mechanism. Accordingly, full data path integrity protection in a memory system can be achieved. In some examples, the protection mechanism can implement parity bit generation and checking, a cyclic redundancy check (CRC), or other protection mechanisms. Depending on the capabilities and functionalities of the memory system, circuits that implement the protection mechanism and/or the ECC can be located at different points along data paths. Additionally, in some examples, where communications and corresponding interconnects and interfaces conform to the ARM Advanced Microcontroller Bus Architecture (AMBA) Advanced eXtensible Interface (AXI) specification, the communications that are protected by the protection mechanism can include one or more bits implemented for the purposes of the protection mechanism (e.g., parity bits) that are user bits according to the AXI specification.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

In the description that follows, various signals and data are described in the context of the operation of various circuits. A described signal or data indicates a corresponding node or net on which the signal or data is propagated and further indicates nodes that are communicatively coupled. For example, description of a signal or data output from a first circuit and input to a second circuit indicates an output node of the first circuit (on which the signal or data is output from the first circuit) is communicatively coupled to an input node of the second circuit (on which the signal or data is input to the second circuit). Explicit description of such nodes or nets may be omitted in the following description, but a person having ordinary skill in the art will readily understand the presence of the nodes or nets. Additionally, any signal or data and corresponding node and/or net may be described in the singular, but may include, where appropriate, one or multiple bits and corresponding structure for the one or multiple bits.

FIG. 1 illustrates a simplified schematic of a memory system 100, such as on-chip memory (OCM), according to some examples. The memory system 100 includes read functionality, write functionality, and read-modify-write functionality. Various details of components and signals are omitted from FIG. 1 so as to avoid obscuring aspects of FIG. 1 described herein. For example, the memory system 100 includes various control circuits that control operations of other circuits of the memory system 100. A person having ordinary skill in the art will readily understand the presence and operation of such control circuits in the context of the following description.

In some examples, the memory system 100 is implemented in a processing system of an integrated circuit, and more specifically, in a processing system of a System-on-Chip (SoC). In other examples, the memory system 100 can be implemented as on-chip memory for other subsystems on the same integrated circuit chip and/or can be implemented as off-chip memory from another integrated circuit chip configured to access the memory of the memory system 100.

In the illustrated example, read functionality can be implemented in response to the memory system 100 receiving a read request that includes a memory address that is to be read. A read transaction can be performed in response to the received read request and can include transmitting a read response that includes the read data that is read from memory. Write functionality can be implemented in response to the memory system 100 receiving a write request that includes an address of memory to which write data is to be written and the request data (which is also write data for a write request) of a full width of allocated bits of the write request format for write data. A write transaction can be performed in response to the received write request (that includes a full width of write data) and can include transmitting a write response that includes an indication of whether the write data was written successfully. Read-modify-write functionality can be implemented in response to the memory system 100 receiving a write request that includes an address of memory to which write data is to be written and the request data of a less-than-full width of allocated bits of the write request format for write data. A read-modify-write transaction can be performed in response to the received write request (that includes a less-than-full width of write data) and can include transmitting a write response that includes an indication of whether write data was written successfully. The read, write, and read-modify-write transactions can be implemented by different mechanisms and requests (e.g., by including a dedicated read-modify-write request) in other examples. More details of the generally described requests and transactions are described in the context of examples below; however, a person having ordinary skill in the art will readily understand modifications to the described examples to implement different mechanisms and requests.

The memory system 100 includes an interface circuit 101, a bit appending circuit 102, a request data first-in, first-out (FIFO) buffer 104, a write address FIFO buffer 106, and a read address FIFO buffer 108. The bit appending circuit 102 and buffers 104, 106, 108 are communicatively coupled to the interface circuit 101. The interface circuit 101 is configured to receive requests from a master circuit (MASTER CIR), which may be a part of the same or a different integrated circuit chip as the memory system 100.

The interface circuit 101 has various nodes of bits communicatively coupled to input nodes of the bit appending circuit 102 and buffers 104, 106, 108 to transmit appropriate data to those components. The interface circuit 101 can conform to any specification or standard, in some examples. In some examples, the interface circuit 101 is configured to implement transactions that conform with the ARM Advanced Microcontroller Bus Architecture (AMBA) Advanced eXtensible Interface (AXI) specification, such as the third, fourth, or subsequent generations. The interface circuit 101 is configured to transmit a check bit(s) and request data of a write request (WR REQ) to the bit appending circuit 102, address bits of the write request to the write address FIFO buffer 106, and address bits of a read request (RD REQ) to the read address FIFO buffer 108.

The bit appending circuit 102 is configured to append the check bit(s) to the request data of the corresponding write request, such as by prepending or post-pending the check bits to the request data. The request data FIFO buffer 104 is configured to store (e.g., as temporary storage) the request data and appended check bits, e.g., for subsequent processing. The write address FIFO buffer 106 is configured to store (e.g., as temporary storage) the address bits of the write request, and the read address FIFO buffer 108 is configured to store (e.g., as temporary storage) the address bits of the read request.

Output nodes of the request data FIFO buffer 104 are communicatively coupled to input nodes (e.g., concatenated nodes on which the request data and appended check bits are propagated) of a multiplexer stage 110. Other input nodes (e.g., concatenated nodes) of the multiplexer stage 110 are communicatively coupled to a feedback of a read stage, as described in further detail below. The multiplexer stage 110 can include one or more multiplexers and/or other selection and concatenating logic. The multiplexer stage 110 is configured to selectively output, as write data at any given instance, a full width or a portion of a full width of the request data and corresponding appended check bits output from the request data FIFO buffer 104 and/or a portion of a full width of read data and corresponding appended check bits from the feedback of the read stage. For example, for a write transaction, the multiplexer stage 110 selectively outputs, as write data, the full width of the request data and appended check bits from the request data FIFO buffer 104 that was received in the write request. Further, for example, for a read-modify-write transaction, the multiplexer stage 110 selectively outputs, as write data, the less-than-full width of the request data and corresponding appended check bits from the request data FIFO buffer 104 that was received in the write request and further outputs a remaining width of read data and corresponding check bits from the feedback of the read stage. In such a read-modify-write transaction, the respective portions of the request data from the request data FIFO buffer 104 and the read data from the feedback are concatenated and output from the multiplexer stage 110 to form a full width of write data to be written. Additional details of such transactions are illustrated in a subsequent example.

Output nodes of the multiplexer stage 110 are communicatively coupled to respective input nodes of a data processing stage 112. The data processing stage 112 includes a bit checker circuit 114 and an ECC encoder 116. The bit checker circuit 114 has input nodes communicatively coupled to respective output nodes of the multiplexer stage 110 and is configured to receive write data appended with check bits output from the multiplexer stage 110. The bit checker circuit 114 is configured to perform a data protection check on the write data using the check bits for comparison. In some examples, the bit checker circuit 114 is configured to perform a parity check, such as by exclusive ORing the write data bits and comparing the result of the exclusive OR to the check bit (e.g., a parity bit). In some examples, one parity bit is included for checking eight bits of data, such that, for example, 128 bits of write data results in 16 parity bits being implemented. A parity bit may be used for any number of bits of write data in other examples. In some examples, the bit checker circuit 114 is configured to perform a cyclic redundancy check (CRC) using the check bits (e.g., a check value code). The bit checker circuit 114 can include any logic and/or other circuit configured to perform the data protection check. If an error is detected in the write data based on the data protection check, an error signal (ERR) is asserted. The error signal can be written to a status register of the memory system 100, communicated back (via the interface circuit 101) to the master circuit that transmitted the corresponding request, or any other appropriate action. In some examples, assertion of the error signal can cause a master circuit (e.g., a processing system) of the integrated circuit on which the memory system 100 is disposed to flush the data paths and attempt to execute the request again, and/or to reset the memory system 100 and attempt to execute the request again.

The ECC encoder 116 has an input node communicatively coupled to an output node of the multiplexer stage 110 and is configured to receive the write data output from the multiplexer stage 110. The ECC encoder 116 is configured to generate one or more encoded ECC values based on the received write data using an appropriate ECC algorithm. In the illustrated example, an ECC encoder 116 is generally illustrated. In practice, multiple ECC encoders may be implemented, for example, due to the number of bits of the write data that is received. For example, if 128 bits of write data are received, two ECC encoders can be implemented with each ECC encoder being configured to receive respective 64 bits of the write data and generate encoded ECC values based on the respective 64 bits of the write data. The ECC encoder 116 is configured to output the received write data (e.g., to pass through the received write data) and the encoded ECC values to an output node of the ECC encoder 116, which is also an output node of the data processing stage 112.

Referring back to the write address FIFO buffer 106, an output node of the write address FIFO buffer 106 is communicatively coupled to an input node of a write address generator 120. The write address generator 120 is configured to generate an address of memory to which the request data of the write request is to be written for a write transaction and an address of memory from which data is to be read and subsequently re-written for a read-modify-write transaction. For example, the address of the write request may be a virtual memory address, and the write address generator 120 is configured to translate the virtual memory address to a physical memory address.

An output node of the write address generator 120 is communicatively coupled to an input node of the data processing stage 112. The write address generator 120 outputs the address to the data processing stage 112. The data processing stage 112 is further configured to concatenate the write data and corresponding encoded ECC values with the address output from the write address generator 120.

An output node of the data processing stage 112 is communicatively coupled to an input node of a write ECC arbitration FIFO buffer 122. The write ECC arbitration FIFO buffer 122 is configured to store (e.g., as temporary storage) the write data, encoded ECC values, and address bits, e.g., for subsequent processing.

Referring back to the read address FIFO buffer 108, an output node of the read address FIFO buffer 108 is communicatively coupled to an input node of a read address generator 124. The read address generator 124 is configured to generate an address of memory from which read data is to be read. For example, the address of the read request may be a virtual memory address, and the read address generator 124 is configured to translate the virtual memory address to a physical memory address.

An output node of the write ECC arbitration FIFO buffer 122, an output node of the data processing stage 112 indicating a memory read as part of a read-modify-write-transaction, and an output node of the read address generator 124 are communicatively coupled to respective input nodes of an arbitration circuit 128 of a memory controller 126. The arbitration circuit 128 is configured to forward requests to an execution circuit 130 based on an appropriate arbitration scheme. The arbitration circuit 128 receives a memory write with the generated address, write data, and encoded ECC values from the write ECC arbitration FIFO buffer 122. The arbitration circuit 128 receives a memory read, as part of a read-modify-write-transaction, including the generated address from the data processing stage 112. The arbitration circuit 128 receives a memory read including the generated address from the read address generator 124. The arbitration circuit 128 determines an order to forward various transactions to the execution circuit 130 and responsively forwards the transactions in that order from an output node of the arbitration circuit 128 to an input node of the execution circuit 130.

The execution circuit 130 has an input node communicatively coupled to memory 132. The execution circuit 130 causes write data together with the corresponding encoded ECC values to be written to the memory 132 and causes read data to be read from the memory 132 responsive to the received requests. When executing a write transaction or a write portion of a read-modify-write transaction, the execution circuit 130 causes the write data together with the corresponding encoded ECC values to be written at the address of the write request and sends a write response (WR RES) to a write response FIFO buffer 134. The write response FIFO buffer 134 is configured to store (e.g., as temporary storage) the write response, which is subsequently forwarded (e.g., via the interface circuit 101) to the master circuit that transmitted the write request. When executing a read transaction or a read portion of a read-modify-write transaction, the execution circuit 130 causes read data and encoded ECC values to be read from the address of the read request or the write request that indicated the read-modify-write transaction.

An ECC decoder 142 has an input node communicatively coupled to the memory 132. The ECC decoder 142 is configured to receive read data and encoded ECC values from the memory 132, decode the encoded ECC values, and check for errors in the read data based on a comparison of the decoded ECC values with the read data. The ECC decoder 142 is configured to generate one or more decoded ECC values and check for errors in the read data using the decoded ECC values an appropriate ECC algorithm. In the illustrated example, an ECC decoder is generally illustrated. In practice, multiple ECC decoders may be implemented, for example, due to the number of bits of the read data that are read. For example, if 256 bits of read data are read, four ECC decoders can be configured to receive and decode respective 64 bits.

The ECC decoder 142 has an output node communicatively coupled to an input node of a check bit generation circuit 150, an input node of the multiplexer stage 110 (e.g., as feedback), and an input node of a read response FIFO buffer 156. The read data is output from the ECC decoder 142 (e.g., the read data is passed through the ECC decoder 142) to the check bit generation circuit 150, the multiplexer stage 110, and the read response FIFO buffer 156. The check bit generation circuit 150 is configured to generate check bits (e.g., parity bits or a check value code) based on the read data input to the check bit generation circuit 150. In some examples, the check bit generation circuit 150 is configured to generate one or more parity bits, such as by exclusive ORing the read data bits and setting the corresponding check bit (e.g., a parity bit) equal to the result of the exclusive OR. In some examples, one parity bit is included for eight bits of data, such that, for example, 128 bits of data results in 16 parity bits being implemented. A parity bit can be implemented for other numbers of bits of read data. In some examples, the check bit generation circuit 150 is configured to generate a check value code as the check bits using a CRC scheme. The check bit generation circuit 150 can include any logic and/or other circuit configured to generate the check bits based on the read data. The check bit generation circuit 150 is further configured to output the check bits on an output node of the check bit generation circuit 150.

The output node of the check bit generation circuit 150 is communicatively coupled to respective input nodes of the multiplexer stage 110 (e.g., as feedback) and the read response FIFO buffer 156. The check bits output by the check bit generation circuit 150 and the read data output by the ECC decoder 142 together are feedback to the multiplexer stage 110. The multiplexer stage 110 is configured to selectively output, as write data, a full width or portion of a full width of the request data and corresponding check bits output from the request data FIFO buffer 104 and/or a portion of a full width of the read data output from the ECC decoder 142 and corresponding check bits output from the check bit generation circuit 150.

The read response FIFO buffer 156 is configured to store (e.g., as temporary storage) a read response that includes the read data and corresponding check bits. The read response is subsequently forwarded (e.g., via the interface circuit 101) to the master circuit that transmitted the read request.

Figure 2A:
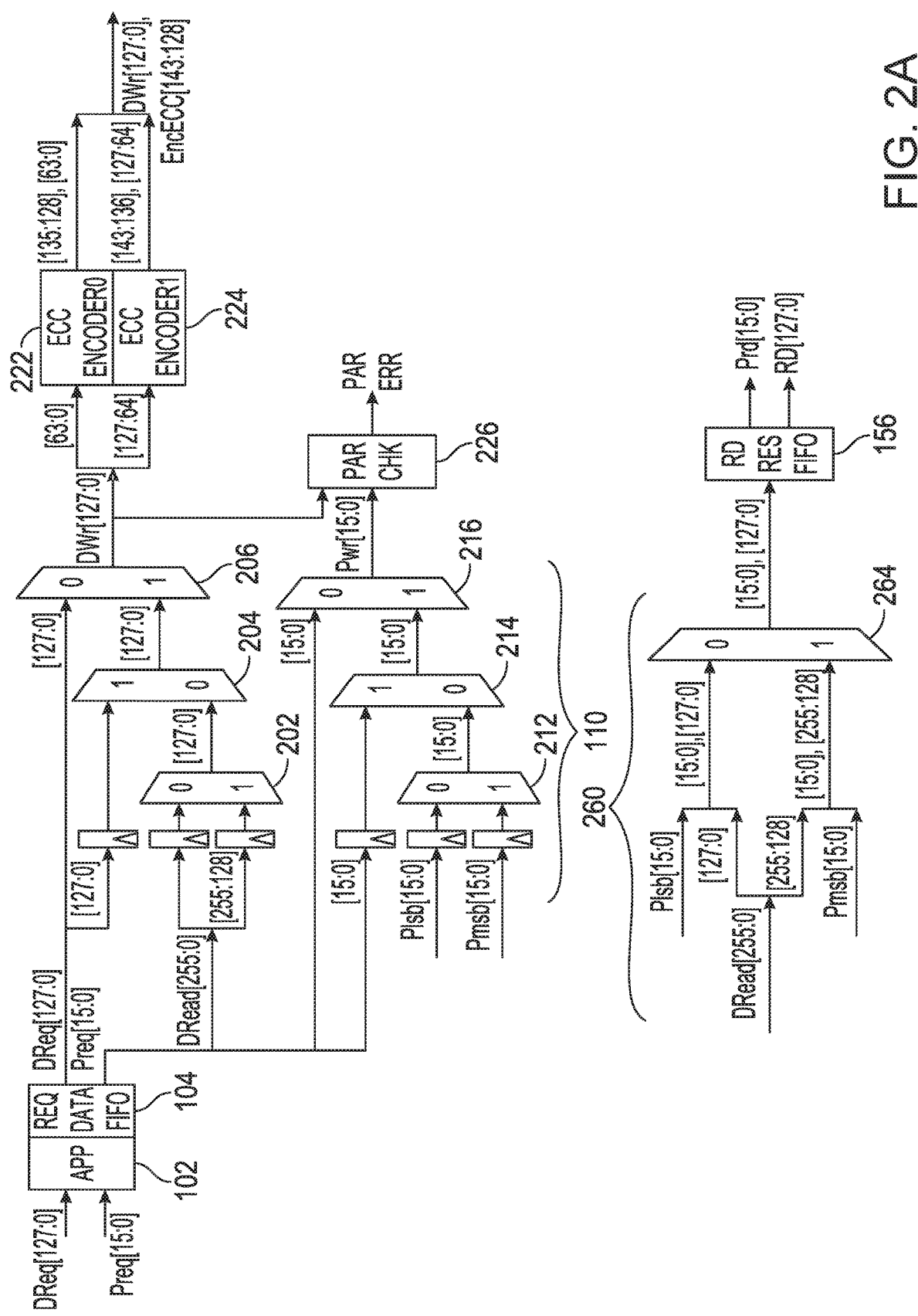
FIGS. 2A, 2B, and 2C illustrate details of aspects of an example implementation of the memory system of FIG. 1 according to some examples.
Figure 2B:
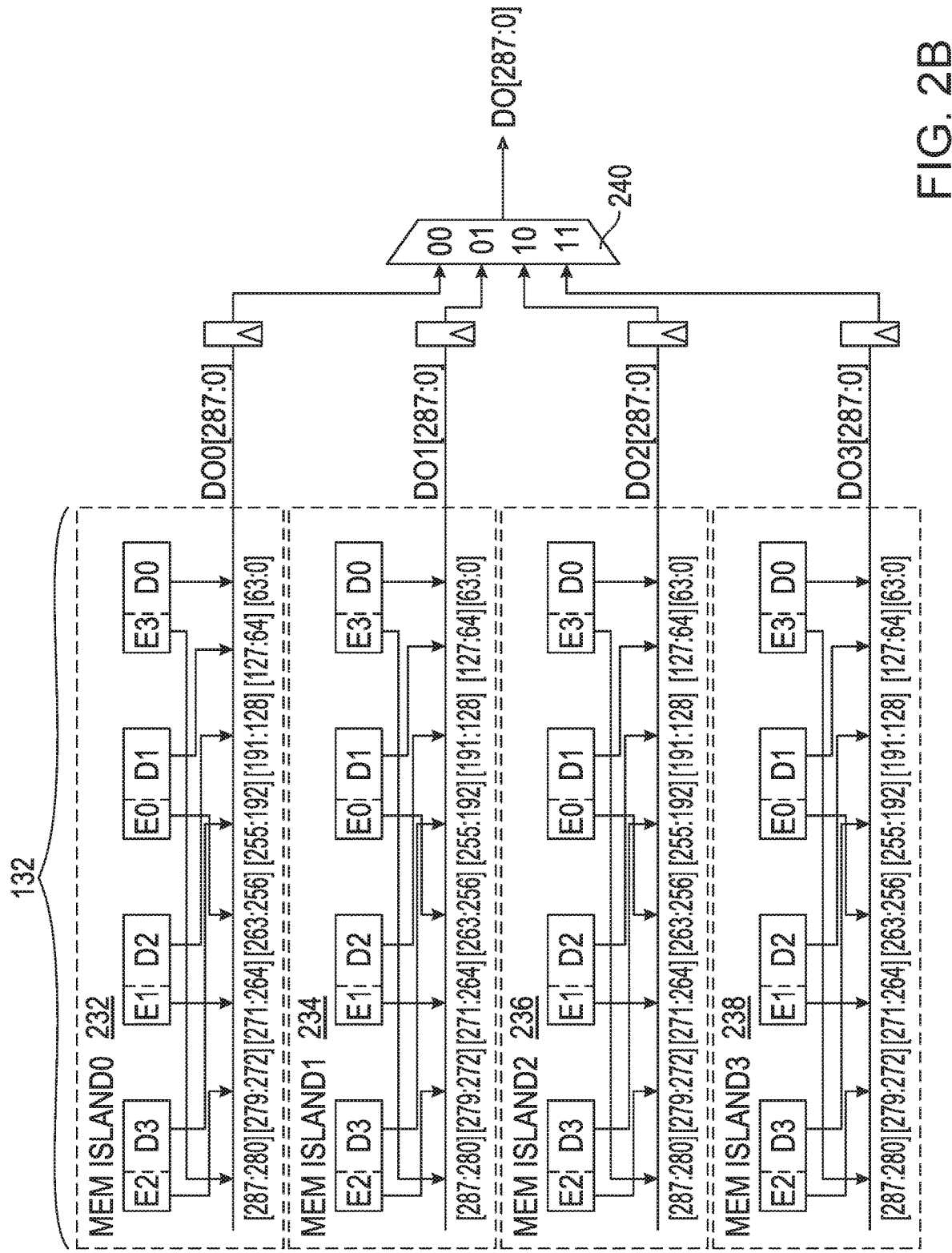
Figure 2C:
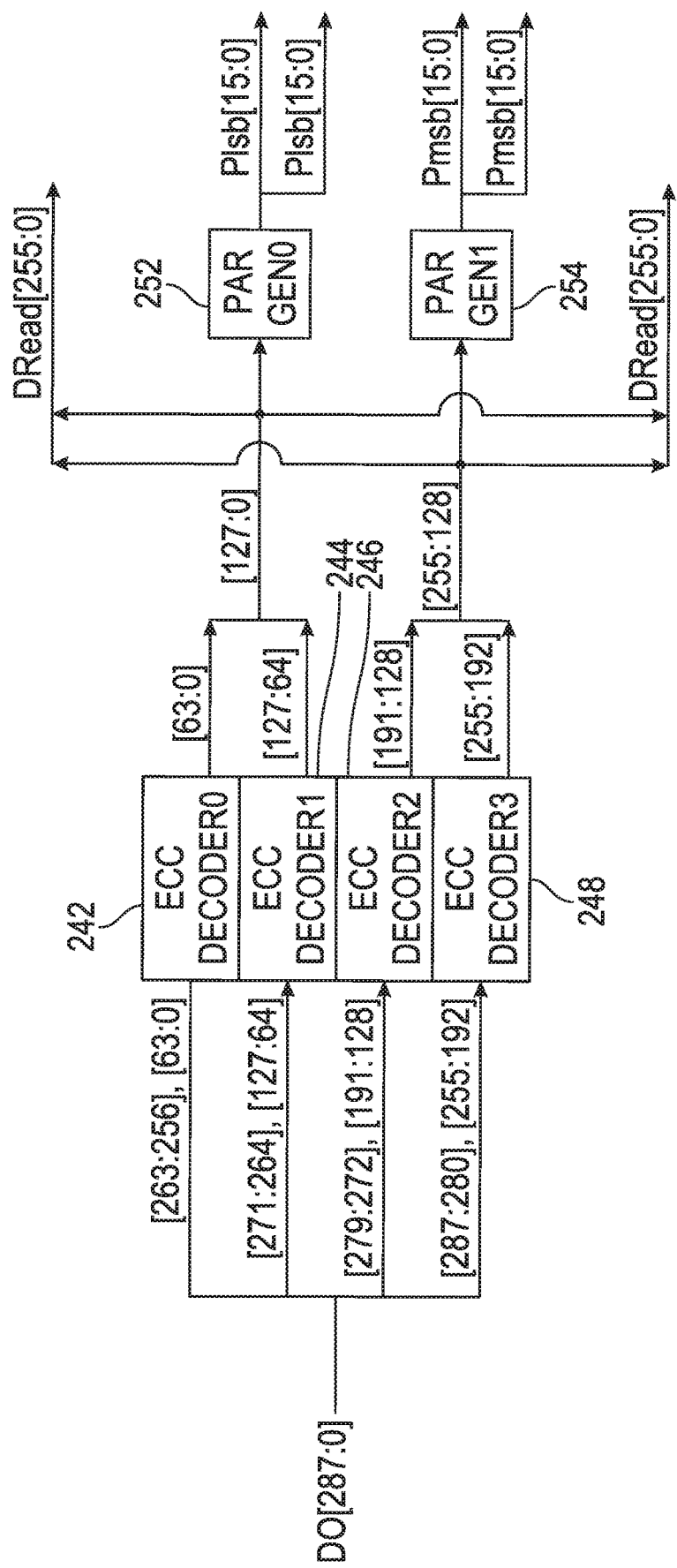

FIGS. 2A, 2B, and 2C illustrate details of aspects of an example implementation of the memory system 100 of FIG. 1 according to some examples. FIGS. 2A-2C illustrate data having various bit-lengths and corresponding multiplexing, encoding, and decoding as an example. The example of FIGS. 2A-2C further illustrates a parity scheme, while other examples implement other protection schemes. Concepts described herein can be extended to different bit-lengths, etc. Various registers, flip-flops, or other synchronous components are illustrated in FIGS. 2A-2C although not explicitly described herein. A person having ordinary skill in the art will readily understand the connections of these synchronous components and their operation based on FIGS. 2A-2C, and as such, description of these synchronous components herein is omitted for brevity.

The bit appending circuit 102 receives 128 bits of request data (DReq[127:0]) and 16 bits of parity bits (Preq[15:0]) for the DReq[127:0]. Each bit of the Preq[15:0] is for a corresponding 8 bit byte of the DReq[127:0]. The bit appending circuit 102 is configured to append the Preq[15:0] to the DReq[127:0] and cause the Preq[15:0] and DReq[127:0] to be stored together in the request data FIFO buffer 104. The request data FIFO buffer 104 is configured to store the Preq[15:0] and DReq[127:0] together and to subsequently output the Preq[15:0] and DReq[127:0].

The DReq[127:0] and Preq[15:0] are received from a write request. The format for a write request, in this example, therefore has 128 bits allocated for a full width of write data. The format for a write request, in this example, can have indication bits allocated to indicate whether some respective subset of the full width of the write data is valid or invalid data. For example, the format can include 16 bits of indication bits, where each indication bit indicates whether a respective byte of the 128 bits of the full width is valid or invalid data. As another example, the format can include 4 bits of indication bits, where each indication bit indicates whether a respective 32 bits of the 128 bits of the full width is valid or invalid data. If a write request is received where the indication bits indicate that all 128 bits of the DReq[127:0] is valid data, a control circuit (e.g., a controller) interprets the write request as indicating a write transaction, and a write transaction is implemented in response to the write request. If a write request is received where one or more of the indication bits indicates that some bits of the DReq[127:0] are invalid data, the control circuit interprets the write request as indicating a read-modify-write transaction, and a write read-modify-write transaction is implemented in response to the write request. The control circuit can output various signals, such as to the multiplexing stage 100 as will be described, based on how a write request is interpreted.

The Preq[15:0] and DReq[127:0] output from the request data FIFO buffer 104 are input to the multiplexer stage 110. The multiplexer stage 110 includes multiplexers 202, 204, 206, 212, 214, 216. The multiplexer 202 receives the 128 least significant bits ([127:0]) of 256 bits of read data (DRead[255:0]) at one input and receives the 128 most significant bits ([255:128]) of the DRead[255:0] at another input. The multiplexer 202 is therefore configured to output 128 bits ([127:0]) of the DRead[255:0]. The multiplexer 204 receives the 128 bits ([127:0]) output by the multiplexer 202 at one input and receives the (e.g., synchronous) DReq[127:0] output by the request data FIFO buffer 104 at another input. The multiplexer 204 is configured to selectively output subsets of the DReq[127:0] and the [127:0] output by the multiplexer 202. The multiplexer 204 is configured to output 128 bits ([127:0]) that concatenates the subsets that are output. The subsets correspond to the format of the write request that have a corresponding indication bit. Each subset is an integer multiple (e.g., 1, 2, 4, 8) of a byte size due to a parity bit being implemented per byte.

For the sake of illustration, assume that each indication bit in a write request corresponds to a respective 32 bits of the 128 bits of the DReq[127:0]. Hence, four subsets (each of 32 bits) of the DReq[127:0] can be independently indicated as valid or invalid data. The multiplexer 204, in such example, is configured to output (i) as the [31:0], either the [31:0] bits of the DReq[127:0] or the [31:0] bits of the [127:0] output by the multiplexer 202, (ii) as the [63:32], either the [63:32] bits of the DReq[127:0] or the [63:32] bits of the [127:0] output by the multiplexer 202, (iii) as the [95:64], either the [95:64] bits of the DReq[127:0] or the [95:64] bits of the [127:0] output by the multiplexer 202, and (iv) as the [127:96], either the [127:96] bits of the DReq[127:0] or the [127:96] bits of the [127:0] output by the multiplexer 202. For a write transaction where the 4 indication bits each indicate valid data, a control circuit can transmit a signal(s) to the multiplexer 204 to output the DReq[127:0] as the output [127:0]. For a read-modify-write transaction where 2 indication bits indicate the most significant 64 bits are invalid, and 2 indication bits indicate the least significant 64 bits are valid, a control circuit can transmit a signal(s) to the multiplexer 204 to output [63:0] of the DReq[127:0] and [127:64] of the [127:0] output by the multiplexer 202 as the output [127:0] of the multiplexer 204.

The multiplexer 206 receives the 128 bits ([127:0]) output by the multiplexer 204 at one input and receives the (e.g., asynchronous) DReq[127:0] output by the request data FIFO buffer 104 at another input. The multiplexer 206 is therefore configured to output 128 bits of write data (DWr[127:0]) that is either the output of the multiplexer 204 or the (e.g., asynchronous) DReq[127:0].

The multiplexer 212 receives the 16 parity bits (Plsb[15:0]) of the 128 least significant bits of the DRead[255:0] at one input and receives the 16 parity bits (Pmsb[15:0]) of the 128 most significant bits of the DRead[255:0] at another input. The multiplexer 212 is therefore configured to output 16 bits ([15:0]) that is either the Plsb[15:0] or the Pmsb[15:0]. The multiplexer 214 receives the 16 bits ([15:0]) output by the multiplexer 212 at one input and receives the (e.g., synchronous) Preq[15:0] output by the request data FIFO buffer 104 at another input. The multiplexer 214 is configured to selectively output bits of the Preq[15:0] and the [15:0] output by the multiplexer 212. The multiplexer 214 is configured to output 16 bits ([15:0]) that concatenates the bits that are output. The bits that are output correspond to the subsets that are output by the multiplexer 204. For example, continuing the write transaction from above, the control circuit can transmit a signal(s) to the multiplexer 214 to output the Preq[15:0] as the output [15:0]. Continuing the read-modify-write transaction from above, a control circuit can transmit a signal(s) to the multiplexer 214 to output [7:0] of the Preq[15:0] and [15:8] of the [15:0] output by the multiplexer 212 as the output [15:0] of the multiplexer 214.

The multiplexer 216 receives the 16 bits ([15:0]) output by the multiplexer 214 at one input and receives the (e.g., asynchronous) Preq[15:0] output by the request data FIFO buffer 104 at another input. The multiplexer 216 is therefore configured to output 16 bits for the write data (Pwr[15:0]) that is either the output of the multiplexer 214 or the (e.g., asynchronous) Preq[15:0].

In some examples, the respective control signals (not explicitly illustrated) input to the multiplexers 202, 212 are a same control signal; the respective control signals (not explicitly illustrated) input to the multiplexers 204, 214 are a same control signal; and the respective control signals (not explicitly illustrated) input to the multiplexers 206, 216 are a same control signal. A person having ordinary skill in the art upon viewing the logical "0" and "1" input nodes of the multiplexers 202, 204, 206, 212, 214, 216 will appreciate the corresponding operations between the various multiplexers that use a same control signal. For example, the parity bits corresponding to the data output by the multiplexer 206 are output by the multiplexer 216.

The Dwr[127:0] output by the multiplexer 206 are input to ECC encoders 222, 224 and are input to the parity checker circuit 226. The 64 least significant bits ([63:0]) of the Dwr[127:0] output by the multiplexer 206 are input to the ECC encoder 222, and the 64 most significant bits ([127:64]) of the Dwr[127:0] output by the multiplexer 206 are input to the ECC encoder 224. The ECC encoders 222, 224 are configured to generate the respective 8 bits of an encoded ECC value from the 64 bits of input data and output the 64 bits of input data and 8 bits of the encoded ECC value. The ECC encoder 222 outputs 64 bits of input data ([63:0]) and 8 bits of encoded ECC value ([135:128]), and the ECC encoder 224 outputs 64 bits of input data ([127:64]) and 8 bits of encoded ECC value ([143:136]). The bits output from the ECC encoders 222, 224 are concatenated as the write data (DWr[127:0]) with encoded ECC values (EncECC[143:128]). The DWr[127:0] is passed through the ECC encoders 222, 224. DWr[127:0] and EncECC[143:128] are forwarded to the write ECC arbitration FIFO buffer 122 for storage.

The Pwr[15:0] output by the multiplexer 216 are also input to the parity checker circuit 226. The parity checker circuit 226 is configured to perform a parity check on the DWr[127:0] output by the multiplexer 206 using the Pwr[15:0] output by the multiplexer 216. As indicated above in the illustrated example, one bit of the Pwr[15:0] output by the multiplexer 216 is used to perform a parity check of a corresponding one byte of the DWr[127:0] output by the multiplexer 206. Other implementations can implement one parity bit for a different number of bits of data. If any parity check performed by the parity checker circuit 226 detects an error, the parity checker circuit 226 is configured to assert (e.g., as a logical "1") a parity error signal (PAR ERR).

The memory 132 includes memory islands 232, 234, 236, 238. Each memory island 232-238 includes memory partitions structured to store 8 byte wide data (Dx) and a 1 byte wide encoded ECC value (Ex). In the illustrated example, D0 corresponds to the 64 least significant bits of data; D1 corresponds to the 64 next least significant bits of data; D2 corresponds to the 64 next least significant bits of data; and D3 corresponds to the 64 most significant bits of data. E0 corresponds to the 8 bits of an encoded ECC value for D0; E1 corresponds to the 8 bits of an encoded ECC value for D1; E2 corresponds to the 8 bits of an encoded ECC value for D2; and E3 corresponds to the 8 bits of an encoded ECC value for D3. For each memory island 232-238, a memory partition is structured to store D0 and E3; another memory partition is structured to store D1 and E0; another memory partition is structured to store D2 and E1; and another memory partition is structured to store D3 and E2.

When data is to be read from a memory island 232-238, the memory islands 232-238 restructure the D0-D3 and E0-E3 read from appropriate addresses. D0 is ordered at the least significant bits ([63:0]). D1 is ordered at the next least significant bits ([127:64]). D2 is ordered at the next least significant bits ([191:128]). D3 is ordered at the next least significant bits ([255:192]). E0 is ordered at the next least significant bits ([263:256]). E1 is ordered at the next least significant bits ([271:264]). E2 is ordered at the next least significant bits ([279:272]). E3 is ordered at the most significant bits ([287:280]). Hence, each memory island 232-238 outputs corresponding 288 bits of data with encoded ECC values. Memory island 232 outputs data (DO0[287:0]); memory island 234 outputs data (DO1[287:0]); memory island 236 outputs data (DO2[287:0]); and memory island 238 outputs data (DO3[287:0]).

The DO0[287:0], DO1[287:0], DO2[287:0], and DO3[287:0] are output to respective inputs of a multiplexer 240. The multiplexer 240 is configured to selectively output one of the DO0[287:0], DO1[287:0], DO2[287:0], and DO3[287:0] as data output (DO[287:0]). A control signal (not explicitly illustrated) can be at least part of an address of, e.g., a read request that indicates which memory island 232-238 is read.

The 288 bits (DO[287:0]) output by the multiplexer 240 are input to ECC decoders 242, 244, 246, 248. The bits [63:0] and bits [263:256] of the 288 bits (DO[287:0]) output by the multiplexer 240 (corresponding to D0 and E0) are input to the ECC decoder 242. The bits [127:64] and bits [271:264] of the 288 bits (DO[287:0]) output by the multiplexer 240 (corresponding to D1 and E1) are input to the ECC decoder 244. The bits [191:128] and bits [279:272] of the 288 bits (DO[287:0]) output by the multiplexer 240 (corresponding to D2 and E2) are input to the ECC decoder 246. The bits [255:192] and bits [287:280] of the 288 bits (DO[287:0]) output by the multiplexer 240 (corresponding to D3 and E3) are input to the ECC decoder 248.

The ECC decoders 242, 244, 246, 248 are configured to decode the respective 8 bits of encoded ECC value, check for an ECC error in the respective 64 bits of read data, and feedthrough the respective 64 bits of read data. The ECC decoder 242 outputs 64 bits of read data ([63:0]). The ECC decoder 244 outputs 64 bits of read data ([127:64]). The ECC decoder 246 outputs 64 bits of read data ([191:128]). The ECC decoder 248 outputs 64 bits of read data ([255:192]). The 128 least significant bits output from the ECC decoders 242, 244 are concatenated ([127:0]), and the 128 most significant bits output from the ECC decoders 246, 248 are concatenated ([255:128]). Additionally, the concatenated 128 least significant bits ([127:0]) and the concatenated 128 most significant bits ([255:128]) output from the ECC decoders 242-248 are concatenated into 256 bits of read data (DRead[255:0]), which is input to the multiplexer 202 as feedback as described above.

The concatenated 128 least significant bits ([127:0]) of the DRead[255:0] output from the ECC decoders 242, 244 are input to a parity generation circuit 252, and the concatenated 128 most significant bits ([255:128]) of the DRead[255:0] output from the ECC decoders 246, 248 are input to a parity generation circuit 254. The parity generation circuit 252 is configured to generate and output 16 bits of parity bits (Plsb[15:0]) for the concatenated 128 least significant bits ([127:0]) of the DRead[255:0], and the parity generation circuit 254 is configured to generate and output 16 bits of parity bits (Pmsb[15:0]) for the concatenated 128 most significant bits ([255:128]) of the DRead[255:0]. The parity generation circuits 252, 254 each are configured to generate one parity bit for a corresponding one byte of read data, although one parity bit can be generated for a different number of bits of data. The Plsb[15:0] and Pmsb[15:0] are input to the multiplexer 212 as feedback as described above.

A multiplexer stage 260 includes a multiplexer 264. The Plsb[15:0] and the 128 least significant bits ([127:0]) of the DRead[255:0] are concatenated and received at an input of the multiplexer 264. The Pmsb[15:0] and the 128 most significant bits ([255:128]) of the DRead[255:0] are concatenated and received at another input of the multiplexer 264. The multiplexer 264 is therefore configured to output 16 bits and 128 bits ([15:0],[127:0]) that are (i) the Plsb[15:0] and the 128 least significant bits ([127:0]) of the DRead[255:0], respectively, or (ii) the Pmsb[15:0] and the 128 most significant bits ([255:128]) of the DRead[255:0], respectively.

The read response FIFO buffer 156 receives the 16 bits and 128 bits ([15:0],[127:0]) output by the multiplexer 264. The read response FIFO buffer 156 is configured to store the 16 bits and 128 bits ([15:0],[127:0]) output by the multiplexer 264 together and to subsequently output the 16 bits output by the multiplexer 264 as parity read bits (Prd[15:0]) and output the 128 bits output by the multiplexer 264 as read data (RD[127:0]). The RD[127:0] and Prd[15:0] are communicated to a master circuit in response to a read request transmitted by the master circuit.

Figure 3:
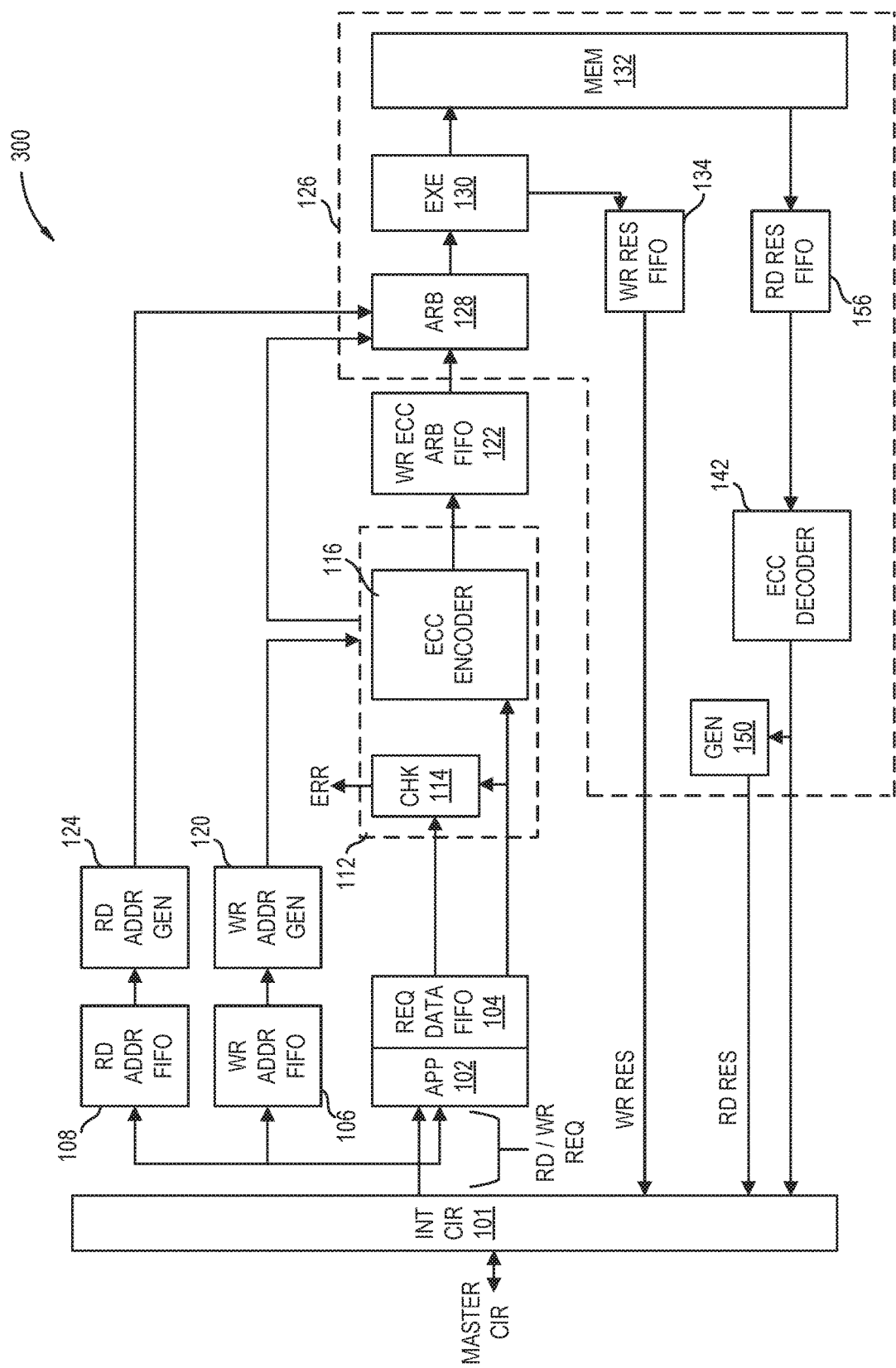
FIG. 3 illustrates another simplified schematic of a memory system according to some examples.

FIG. 3 illustrates a simplified schematic of a memory system 300, such as OCM, according to some examples. The memory system 300 includes read functionality and write functionality, but not read-modify-write functionality. The memory system 300 is similar to and includes components of the memory system 100 of FIG. 1. For brevity, description common to both FIGS. 1 and 3 is omitted.

Generally, components implemented for a feedback path and/or for modification of data in a read-modify-write transaction (e.g., the multiplexer stage 110) are omitted. Further, the absence of the feedback path allows the ECC decoder and the check bit generation circuit to be placed nearer to, e.g., the interface circuit 101 for a read response.

Output nodes of the request data FIFO buffer 104 are communicatively coupled to input nodes of a data processing stage 112. The bit checker circuit 114 has input nodes communicatively coupled to respective output nodes of the request data FIFO buffer 104 and is configured to receive request data (which is also write data in this example) appended with check bits output from the request data FIFO buffer 104. The ECC encoder 116 has an input node communicatively coupled to the output node of the request data FIFO buffer 104 and is configured to receive the request data output from the request data FIFO buffer 104.

The read response FIFO buffer 156 has an input node communicatively coupled to the memory 132. The read response FIFO buffer 156 is configured to store (e.g., as temporary storage) the read data and encoded ECC values. The read response FIFO buffer 156 has an output node communicatively coupled to an input node of the ECC decoder 142. The ECC decoder 142 is configured to receive read data and encoded ECC values from the read response FIFO buffer 156, decode the encoded ECC values, and check for errors based on a comparison of the decoded ECC values with the read data. The ECC decoder 142 has an output node communicatively coupled to an input node of the check bit generation circuit 150. The check bit generation circuit 150 is configured to receive the read data from the ECC decoder 142. The check bit generation circuit 150 is configured to generate check bits (e.g., parity bits or a check value code) based on the read data input to the check bit generation circuit 150.

The read data output by the ECC decoder 142 and the check bits output by the check bit generation circuit 150 are communicated to the interface circuit 101 and packaged together as a read response. The read response is subsequently forwarded to the master circuit that transmitted the read request.

The above-described examples can achieve protection and coverage of a full data path in a memory system. For example, a data path from the check bit generation circuit (e.g., a parity generator) inside the write channel of the master circuit (e.g., an external switch) to the bit checker circuit (e.g., a parity checker) in the memory system before the ECC encoder can be protected. This data path can be an AXI write path. Another data path that is protected is from the check bit generation circuit (e.g., a parity generator) after the ECC decoder to the bit checker circuit (e.g., a parity checker) before the ECC encoder as a feedback path (e.g., for a read-modify-write transaction) can be protected. Another data path that is protected is from the check bit generation circuit (e.g., a parity generator) after the ECC decoder to a bit checker circuit (e.g., a parity checker) inside the read channel of the master circuit (e.g., the external switch). This path can be an AXI read path. AXI user bits can carry check bits (e.g., parity bits) coming into and going out of the memory system.

Examples contemplate any protection scheme to be used to protect these data paths. Some examples implement a parity check. Other examples implement a CRC. A CRC can be implemented for longer and more complex transmissions like in a Network-on-Chip (NoC) or even off-chip. Still further, various examples can be extended to the general usage of bus protection of any other non-OCM designs using the ECC and other (e.g., parity) protection schemes interchangeably on any paths (address, data, or control) to achieve a desired level of protection.

Figure 4:
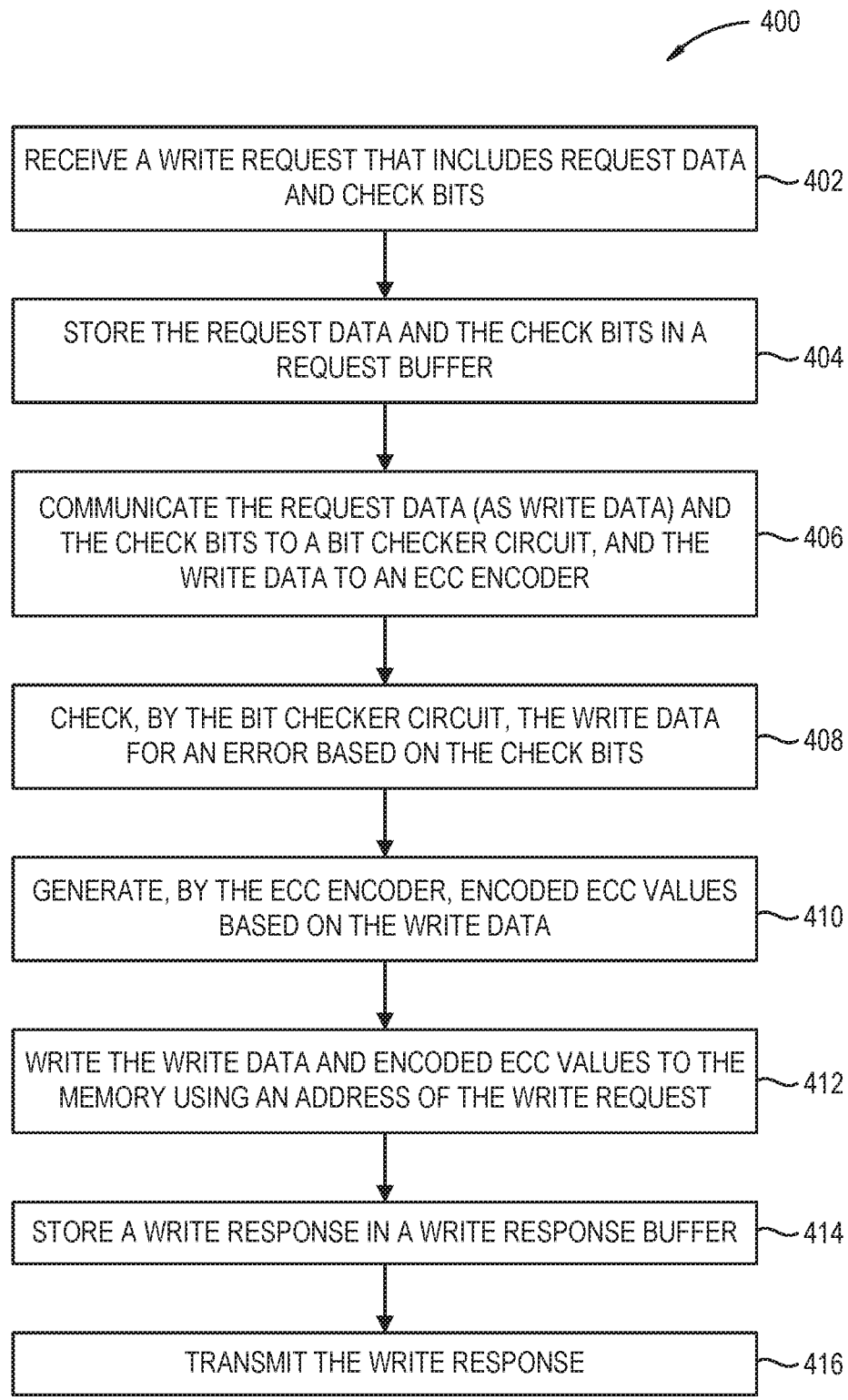
FIG. 4 is a method of a write transaction according to some examples.

FIG. 4 is a method 400 of a write transaction according to some examples. The method 400 is described in the context of the memory system 100 of FIG. 1, and can also be implemented in another memory system.

At block 402, a write request that includes request data (which is also write data in this transaction) and check bits is received. For example, a write request is received at the interface circuit 101 of the memory system 100. According to some examples above, the write request can include indication bits that indicate a full width of the write data is valid data. At block 404, the request data and the check bits are stored in a request buffer. For example, the request data with the check bits appended thereto (e.g., by bit appending circuit 102) are stored in the request data FIFO buffer 104.

At block 406, the request data (as write data) and the check bits are communicated from the request buffer to a bit checker circuit, and the write data is communicated to an ECC encoder. For example, the request data (as write data) and the check bits are communicated from the request data FIFO buffer 104 to the bit checker circuit 114 via the multiplexer stage 110, and the request data (as write data) is communicated from the request data FIFO buffer 104 to the ECC encoder 116 via the multiplexer stage 110. At block 408, the bit checker circuit checks the write data for an error based on the check bits. For example, the bit checker circuit 114 checks the write data for an error based on the check bits, such as performing a parity check, a CRC, or another checking scheme. If an error is detected by the bit checker circuit, the bit checker circuit can assert an error signal, which can cause the data path to be flushed, the memory system to be reset, or any other remedial action.

At block 410 (e.g., without an error being detected), the ECC encoder generates encoded ECC values based on the write data. For example, the ECC encoder 116 generates encoded ECC values based on the write data and outputs the encoded ECC values and write data. At block 412, the write data and encoded ECC values are written to the memory using an address of the write request. For example, the address is communicated from the write address generator 120 (based on an address of the write request received from the interface circuit 101 via the write address FIFO buffer 106) to the data processing stage 112. The data processing stage 112 causes the write data and the encoded ECC values from the ECC encoder 116 to be communicated with the address via the write ECC arbitration FIFO buffer 122 and arbitration circuit 128 to the execution circuit 130. The execution circuit 130 causes the write data and the encoded ECC values to be written to the address of the memory 132.

At block 414, a write response is stored in a write response buffer. For example, the execution circuit 130 causes a write response to be stored in the write response FIFO buffer 134 in response to the execution circuit 130 causing the write data and encoded ECC values to be written to the memory. At block 416, the write response is transmitted. For example, the write response is transmitted via the interface circuit 101 to the master circuit that transmitted the write request.

Figure 5:
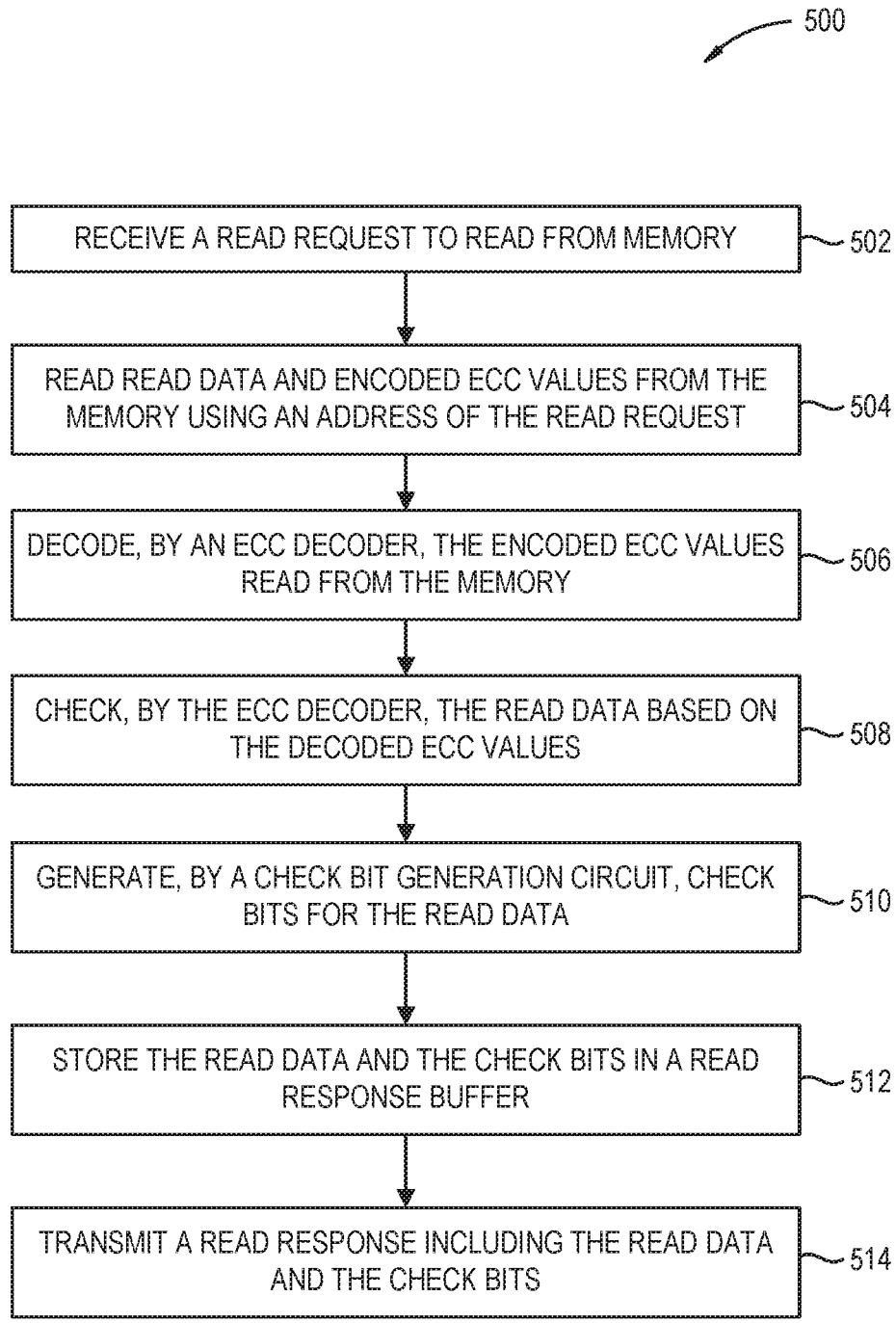
FIG. 5 is a method of a read transaction according to some examples.

FIG. 5 is a method 500 of a read transaction according to some examples. The method 500 is described in the context of the memory system 100 of FIG. 1, and can also be implemented in another memory system.

At block 502, a read request to read from memory is received. For example, a read request is received at the interface circuit 101 of the memory system 100. At block 504, read data and encoded ECC values are read from the memory using an address of the read request. For example, the address is communicated from the read address generator 124 (based on an address of the read request received from the interface circuit 101 via the read address FIFO buffer 108) to the arbitration circuit 128 and then to the execution circuit 130. The execution circuit 130 causes the read data and corresponding encoded ECC values to be read from the address of the memory 132.

At block 506, the encoded ECC values read from the memory are decoded by an ECC decoder. For example, the ECC decoder 142 decodes the encoded ECC values. At block 508, the read data is checked based on the decoded ECC values by the ECC decoder. For example, the ECC decoder 142 checks the read data for errors based on a comparison of the decoded ECC values with the read data. At block 510, check bits are generated by a check bit generation circuit for the read data. For example, the check bit generation circuit 150 generates check bits, such as parity bits, check value codes, or the like, based on and for the read data passed through the ECC decoder 142.

At block 512, the read data and the check bits are stored in a read response buffer. For example, the read response FIFO buffer 156 stores the read data output from the ECC decoder 142 and the check bits output from the check bit generation circuit 150. At block 514, a read response including the read data and the check bits is transmitted. For example, the read response is transmitted via the interface circuit 101 to the master circuit that transmitted the read request.

Figure 6:
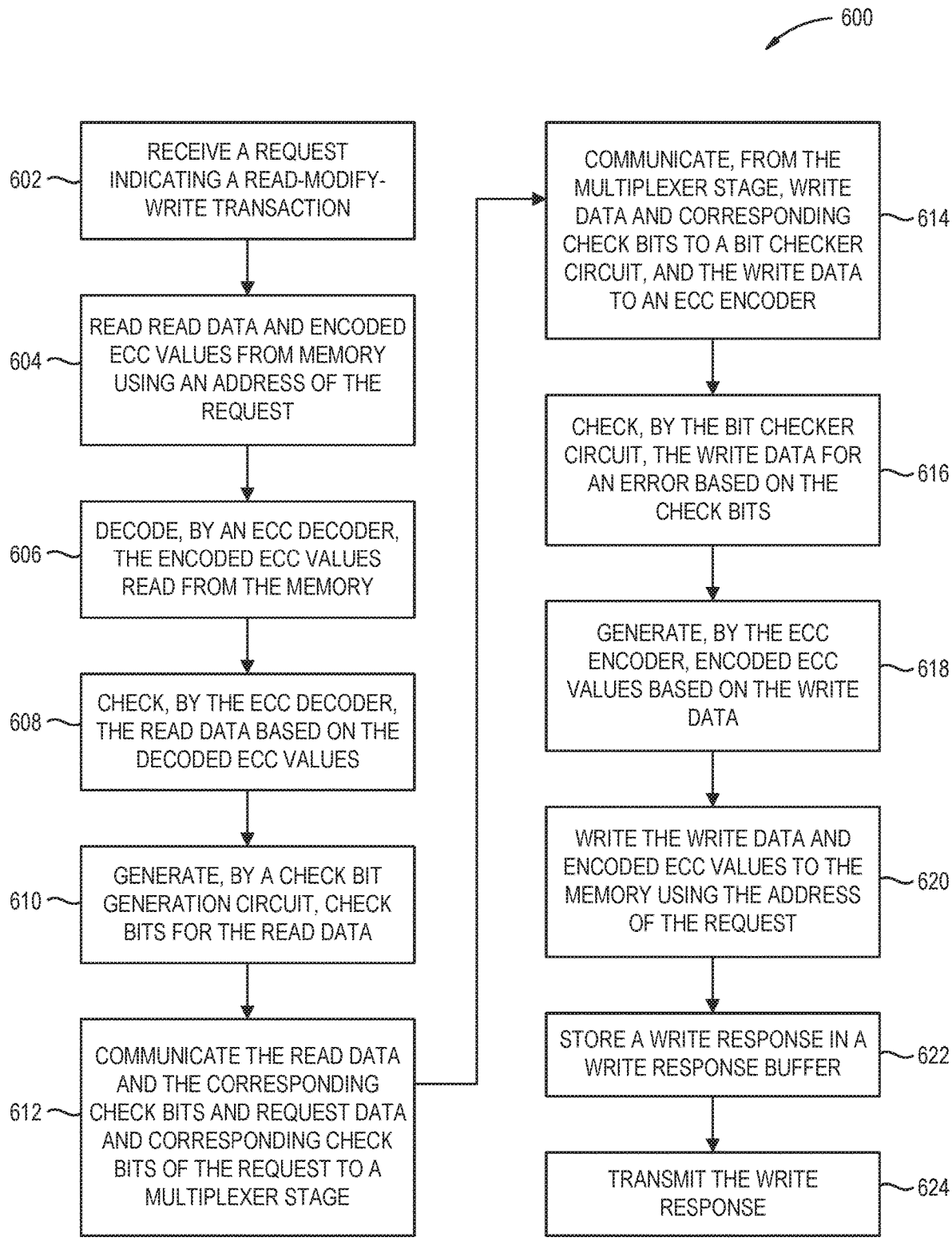
FIG. 6 is a method of a read-modify-write transaction according to some examples.

FIG. 6 is a method 600 of a read-modify-write transaction according to some examples. The method 600 is described in the context of the memory system 100 of FIG. 1, and can also be implemented in another memory system.

At block 602, a request indicating a read-modify-write transaction is received. For example, a write request is received at the interface circuit 101 of the memory system 100. According to some examples above, the write request can include one or more indication bits that indicate at least some of a full width of the write data is invalid data. At block 604, read data and encoded ECC values are read from memory using an address of the request. For example, the address is communicated from the write address generator 120 (based on an address of the write request received from the interface circuit 101 via the write address FIFO buffer 106) to the arbitration circuit 128 and then to the execution circuit 130. The execution circuit 130 causes the read data and encoded ECC values to be read from the address of the memory 132.

At block 606, the encoded ECC values read from the memory are decoded by an ECC decoder. For example, the ECC decoder 142 decodes the encoded ECC values. At block 608, the read data is checked based on the decoded ECC values by the ECC decoder. For example, the ECC decoder 142 checks the read data for errors based on a comparison of the decoded ECC values with the read data. At block 610, check bits are generated by a check bit generation circuit for the read data. For example, the check bit generation circuit 150 generates check bits, such as parity bits, check value codes, or the like, based on and for the read data passed through the ECC decoder 142.

At block 612, the read data and the corresponding check bits and request data and corresponding check bits of the request are communicated to a multiplexer stage. For example, the read data is communicated from the ECC decoder 142 to the multiplexer stage 110, and the check bits corresponding to the read data are communicated from the check bit generation circuit 150 to the multiplexer stage 110. Further, for example, request data from the received request and the corresponding check bits are communicated, via the bit appending circuit 102 and the request data FIFO buffer 104, to the multiplexer stage 110.

At block 614, write data and corresponding check bits are communicated from the multiplexer stage to a bit checker circuit, and the write data is communicated from the multiplexer stage to an ECC encoder. The write data includes a portion of the read data and a portion of the request data that are communicated to the multiplexer stage. The check bits that are output from the multiplexer stage are the check bits that correspond to the respective portions of the read data and request data that are output as the write data. For example, the multiplexer stage 110 outputs as write data respective portions of request data from the request data FIFO buffer 104 and the read data from the ECC decoder 142, and outputs corresponding check bits from the request data FIFO buffer 104 and check bit generation circuit 150. The write data and the check bits are output from by the multiplexer stage 110 to the bit checker circuit 114, and the write data is output from by the multiplexer stage 110 to the ECC encoder 116.

At block 616, the bit checker circuit checks the write data for an error based on the check bits. For example, the bit checker circuit 114 checks the write data for an error based on the check bits, such as performing a parity check, a CRC, or another checking scheme. If an error is detected by the bit checker circuit, the bit checker circuit can assert an error signal, which can cause the data path to be flushed, the memory system to be reset, or any other remedial action.

At block 618 (e.g., without an error being detected), an ECC encoder generates encoded ECC values based on the write data. For example, the ECC encoder 116 generates encoded ECC values based on the write data and outputs the encoded ECC values and the write data. At block 620, the write data and encoded ECC values are written to the memory based on the address of the request. For example, the data processing stage 112 causes the encoded ECC values and the write data from the ECC encoder 116 to be communicated with the address via the write ECC arbitration FIFO buffer 122 and arbitration circuit 128 to the execution circuit 130. The execution circuit 130 causes the encoded ECC values and write data to be written to the address of the memory 132.

At block 622, a write response is stored in a write response buffer. For example, the execution circuit 130 causes a write response to be stored in the write response FIFO buffer 134 in response to the execution circuit 130 causing the write data and encoded ECC values to be written to the memory. At block 624, the write response is transmitted. For example, the write response is transmitted via the interface circuit 101 to the master circuit that transmitted the write request.

Figure 7:
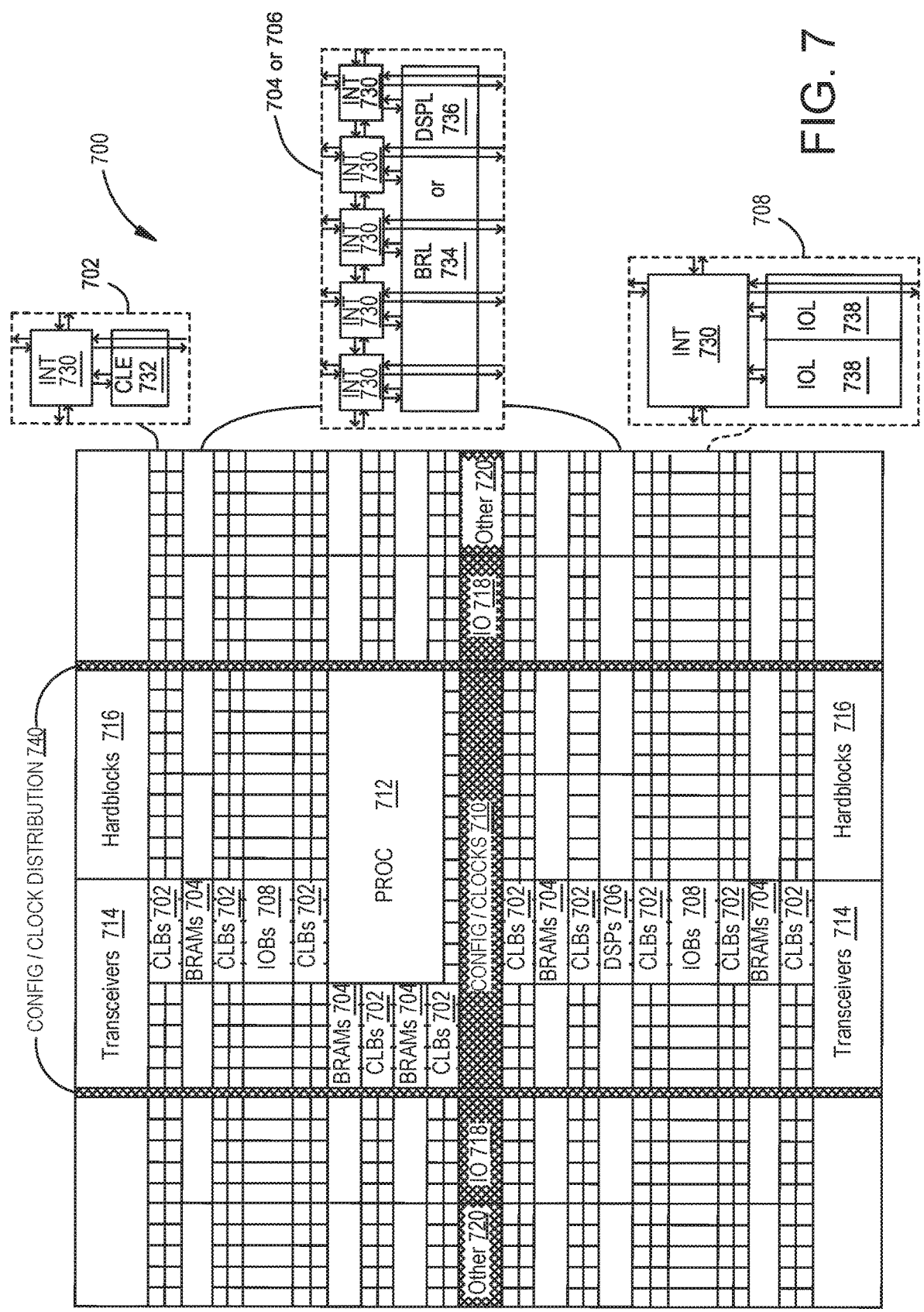
FIG. 7 illustrates a field programmable gate array (FPGA) that may be implemented as a programmable device in which a memory system can be implemented according to some examples.

FIG. 7 illustrates a field programmable gate array (FPGA) 700 that may be implemented as a programmable device in which a memory system can be implemented according to some examples. The FPGA 700 includes a large number of different programmable tiles that form a programmable fabric including configurable logic blocks (CLBs) 702, random access memory blocks (BRAMs) 704, signal processing blocks (DSPs) 706, input/output blocks (IOBs) 708, and configuration and clocking logic (CONFIG/CLOCKS) 710. The FPGA 700 also includes a dedicated processor block 712, digital transceivers 714, dedicated hardblocks 716, specialized input/output blocks (10) 718 (e.g., configuration ports and clock ports), and other programmable logic 720 such as digital clock managers, system monitoring logic, and so forth. The hardblocks 716 can be any circuit, such as a memory controller, a Peripheral Component Interconnect Express (PCIe) hardblock, etc. In some examples, one or more of the hardblocks 716 is or includes a memory system as described above. In some examples, the processor block 712 includes a memory system as described above.

In the illustrated FPGA 700, each programmable tile includes a programmable interconnect element (INT) 730 having connections to input and output terminals of respective programmable interconnect elements 730 in each adjacent tile and having connections to input and output terminals of a programmable logic element within the same tile. The programmable interconnect elements 730 taken together implement a programmable interconnect structure for the illustrated FPGA 700.

As an example, a CLB 702 includes a configurable logic element (CLE) 732 that can be programmed to implement user logic plus a single programmable interconnect element 730. A BRAM 704 can include a BRAM logic element (BRL) 734 in addition to one or more programmable interconnect elements 730. Typically, the number of interconnect elements included in a tile depends on the height of the tile. In the illustrated example, a BRAM tile has the same height as five CLBs, but other numbers (e.g., four) can also be used. A signal processing block 706 can include a DSP logic element (DSPL) 736 in addition to an appropriate number of programmable interconnect elements 730. An input/output block 708 can include, for example, two instances of an input/output logic element (IOL) 738 in addition to one instance of the programmable interconnect element 730. As will be clear to those of skill in the art, the actual I/O pads connected, for example, to the input/output logic element 738 typically are not confined to the area of the input/output logic element 738.

In the illustrated example, a horizontal area near the center of the die is used for configuration, clock, and other control logic. Vertical columns 740 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, processor block 712 spans several columns of CLBs and BRAMs.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. An integrated circuit comprising:
a bit checker circuit configured to check write data for an error based on one or more write-path check bits, the write data to be written to memory;
an Error Correcting Code (ECC) encoder circuit configured to generate a write encoded ECC value based on the write data, the write encoded ECC value to be written to the memory with the write data;
an ECC decoder circuit configured to decode a read encoded ECC value and check read data for an error based on the read encoded ECC value, the read encoded ECC value and the read data being read from the memory;
a check bit generation circuit configured to generate one or more read-path check bits from the read data; and
a multiplexer stage communicatively coupled to the bit checker circuit and the ECC encoder circuit, and configured to output the write data and the write-path check bits.

2. The integrated circuit of claim 1, wherein:
the one or more write-path check bits are one or more write-path parity bits;
the bit checker circuit is configured to perform a parity check for a parity error;
the one or more read-path check bits are one or more read-path parity bits; and
the check bit generation circuit is configured to implement a parity bit generation scheme to generate the one or more read-path parity bits.

3. The integrated circuit of claim 1, wherein the multiplexer stage comprises a first input configured to receive request data of a request and one or more request check bits of the request and having a second input communicatively coupled to the ECC decoder circuit and the check bit generation circuit and configured to receive the read data and the one or more read-path check bits, an output of the multiplexer stage being communicatively coupled to the bit checker circuit and the ECC encoder circuit, the multiplexer stage being configured to selectively output, as the write data, (i) the request data and (ii) a subset of the request data and a subset of the read data, and to selectively output, as the one or more write-path check bits, (i) the one or more request check bits and (ii) a subset of the one or more request check bits and a subset of the one or more read-path check bits.

4. The integrated circuit of claim 3 further comprising a buffer configured to store the request data and the one or more request check bits appended to the request data, the buffer being communicatively coupled to the first input of the multiplexer stage.

5. The integrated circuit of claim 3 further comprising a memory system comprising the ECC encoder circuit, the bit checker circuit, the ECC decoder circuit, the check bit generation circuit, and the multiplexer stage, wherein the memory system is configured to, for a write transaction implemented by the memory system in response to the request:
cause the multiplexer stage to selectively output, as the write data and the one or more write-path check bits, respectively, the request data and the one or more request check bits;
cause the write data and the write encoded ECC value to be written to the memory using an address of the request; and
transmit a write response in response to writing the write data and the write encoded ECC value to the memory.

6. The integrated circuit of claim 3 further comprising a memory system comprising the ECC encoder circuit, the bit checker circuit, the ECC decoder circuit, the check bit generation circuit, and the multiplexer stage, wherein the memory system is configured to, for a read transaction implemented by the memory system in response to the request:
cause the read data to be read from the memory using an address of the request; and
transmit a read response including the read data and the one or more read-path check bits.

7. The integrated circuit of claim 3 further comprising a memory system comprising the ECC encoder circuit, the bit checker circuit, the ECC decoder circuit, the check bit generation circuit, and the multiplexer stage, wherein the memory system is configured to, for a read-modify-write request transaction implemented by the memory system in response to the request:
cause the read data to be read from the memory using an address of the request;
cause the multiplexer stage to selectively output, as the write data, a subset of the request data and a subset of the read data, and to selectively output, as the one or more write-path check bits, a subset of the one or more request check bits and a subset of the one or more read-path check bits;
cause the write data and the write encoded ECC value to be written to the memory using the address of the request; and
transmit a response in response to writing the write data and the write encoded ECC value to the memory.

8. The integrated circuit of claim 1 further comprising a memory system comprising the ECC encoder circuit, the bit checker circuit, the ECC decoder circuit, and the check bit generation circuit, wherein the memory system is configured to, for a write transaction implemented by the memory system in response to a request:

cause the write data and the write encoded ECC value to be written to the memory using an address of the request; and transmit a write response in response to writing the write data and the write encoded ECC value to the memory.

9. The integrated circuit of claim 1 further comprising a memory system comprising the ECC encoder circuit, the bit checker circuit, the ECC decoder circuit, and the check bit generation circuit, wherein the memory system is configured to, for a read transaction implemented by the memory system in response to a request:

cause the read data to be read from the memory using an address of the request; and transmit a read response including the read data and the one or more read-path check bits.

10. The integrated circuit of claim 1 further comprising:

a memory system comprising the memory, the ECC encoder circuit, the bit checker circuit, the ECC decoder circuit, and the check bit generation circuit; and a master circuit configured to access the memory via a communication with the memory system, the master circuit and the memory system being on a same integrated circuit chip.

11. A method comprising:

receiving, by a memory system, a request;

reading read data and a read encoded Error Correcting Code (ECC) value from memory based on the request;

checking, by an ECC decoder circuit of the memory system, the read data based on the read encoded ECC value;

generating, by a check bit generation circuit of the memory system, one or more read-path check bits based on the read data; and communicating to a bit checker circuit of the memory system and an ECC encoder circuit of the memory system, as write data, a subset of the read data and a subset of request data of the request.

12. The method of claim 11 further comprising transmitting from the memory system a read response that includes the read data and the one or more read-path check bits.

13. The method of claim 11 further comprising:

communicating to the bit checker circuit, as one or more write-path check bits, a subset of the one or more read-path check bits and a subset of one or more request check bits of the request;

checking, by the bit checker circuit, the write data for an error based on the one or more write-path check bits;

generating, by the ECC encoder circuit, a write encoded ECC value based on the write data; and writing the write data and the write encoded ECC value to the memory of the memory system based on the request.

14. The method of claim 13 further comprising asserting an error signal by the bit checker circuit when the bit checker circuit detects an error in the write data.

15. The method of claim 13, wherein communicating the write data and the one or more write-path check bits comprises selectively outputting, from a multiplexer stage, the write data to the bit checker circuit and the ECC encoder circuit, a first input node of the multiplexer stage being communicatively coupled to an output node of the ECC decoder circuit and configured to receive the read data, a second input node of the multiplexer stage being configured to receive the request data of the request.

16. The method of claim 13 further comprising transmitting a write response from the memory system in response to writing the write data and the write encoded ECC value to the memory.

17. A method comprising:

receiving, by a memory system, a request that includes request data and one or more request check bits;

checking, by a bit checker circuit of the memory system, the request data for an error based on the one or more request check bits;

generating, by an Error Correcting Code (ECC) encoder circuit of the memory system, an encoded ECC value based on the request data;

writing the request data and the encoded ECC value to memory of the memory system; and selectively outputting, from a multiplexer stage, the request data and the one or more request check bits to the bit checker circuit and the request data to the ECC encoder circuit.

18. The method of claim 17 further comprising transmitting from the memory system a write response in response to writing the request data and the encoded ECC value to the memory.

19. The method of claim 17 further comprising:

storing the request data with the one or more request check bits appended thereto in a buffer of the memory system;

outputting the request data and the one or more request check bits from the buffer to the bit checker circuit; and outputting the request data from the buffer to the ECC encoder circuit.

20. The method of claim 17, wherein a first input node of the multiplexer stage is configured to receive the request data and the one or more request check bits, and a second input node of the multiplexer stage is configured to receive feedback data in the memory system.

* * * * *